No. 812,312. PATENTED FEB. 13, 1906.
H. D. WARD.
COVERED SPOON.
APPLICATION FILED MAR. 20, 1905.
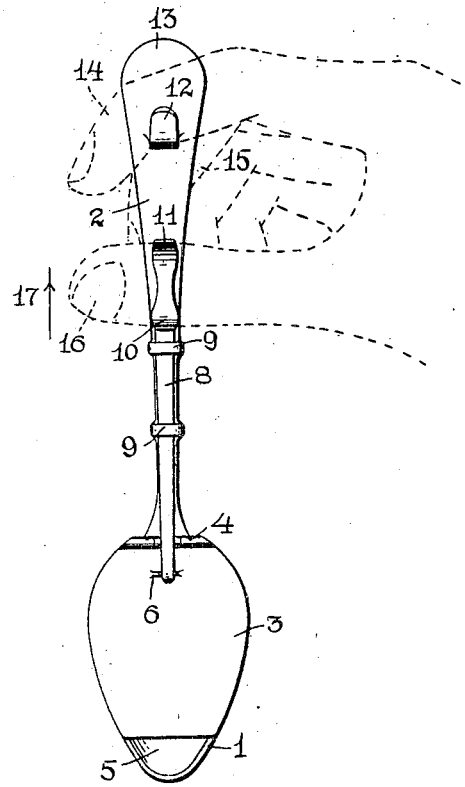
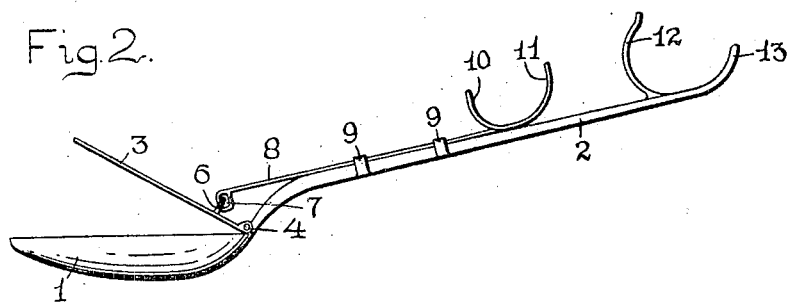
Witnesses
Roy D. Tolman.
Penelope Cumberbach
Inventor
Henry D. Ward.
By Rufus B. Fowler
Attorney.

UNITED STATES PATENT OFFICE.

HENRY D. WARD, OF WORCESTER, MASSACHUSETTS, ASSIGNOR OF ONE-HALF TO IRA B. HUBBARD, OF WORCESTER, MASSACHUSETTS.

COVERED SPOON.

No. 812,312.     Specification of Letters Patent.     Patented Feb. 13, 1906.

Application filed March 20, 1905. Serial No. 251,011.

*To all whom it may concern:*

Be it known that I, HENRY D. WARD, a citizen of the United States, residing at Worcester, in the county of Worcester and Commonwealth of Massachusetts, have invented a new and useful Improvement in Covered Spoons, of which the following is a specification accompanied by drawings, forming a part of the same, in which—

Figure 1 represents a top view of my improved covered spoon with the cover closed upon the bowl of the spoon. Fig. 2 is a side view of the same with the cover raised.

Similar reference-figures refer to similar parts in both the views.

The object of my present invention is to provide a cover for the bowl of the spoon with connected operative mechanism by which the cover may be raised and lowered from the handle of the spoon by means of a cover-actuating mechanism capable of being operated by the same hand which supports the spoon; and it consists in the construction and arrangement of parts, as hereinafter described, and pointed out in the annexed claims.

Referring to the accompanying drawings, 1 denotes the bowl of a spoon; 2, the handle, which may be of any desired size, shape, or pattern. A cover 3 is hinged at 4 at the junction of the handle and bowl of the spoon, said cover being adapted to cover as much of the bowl of the spoon as desired. When the spoon is to be used as a mustache-spoon or as a medicine-spoon, a portion of the tip of the bowl, as shown at 5, Fig. 1, is left uncovered in order that the contents of the bowl may be removed therefrom when the cover is closed. The top of the cover 3 near the hinge 4 is provided with a short upwardly-projecting bracket 6, provided with a hole to receive the eye 7 on the end of a sliding bar 8, which rests upon the top of the handle and is capable of sliding thereon in clips 9 9. The opposite end of the sliding bar 8 is provided with upwardly-curved arms 10 11, adapted to inclose the end of the thumb, and near the end of the handle is an upwardly-curved arm 12 to receive the pressure of the forefinger in resisting the action of the thumb.

The tip of the handle is preferably turned upwardly at 13, the space inclosed between the arm 12 and the tip 13 of the handle receiving the forefinger. The spoon is held as represented in Fig. 1, where the position of the hand is indicated by broken lines with the forefinger 14 resting against the curved arm 12, with the second finger 15 extended beneath the handle, and with the end of the thumb 16 inserted between the curved arms 10 and 11. In this position of the hand the handle of the spoon is firmly held against the bent second finger 15 by the forefinger and thumb, which extend over the top of the handle. In order to lift the cover, the thumb is pressed against the arm 11 in the direction of the arrow 17, Fig. 1, and as any movement of the handle of the spoon is resisted by the forefinger resting against the arm 12 the sliding bar 8 will be moved through the clips 9 9 and the cover raised to any height desired. To close the cover, the movement of the thumb is reversed and sufficient pressure exerted against the arm 10 to hold the cover firmly on the bowl 1.

What I claim as my invention, and desire to secure by Letters Patent, is—

1. The combination with the bowl and handle of a spoon, of a cover hinged to the spoon at the junction of the handle and bowl, a bar hinged at one end to said cover, ways on said handle for said bar, and arms at the opposite end of said bar adapted to inclose the thumb of the operator.

2. The combination with the bowl and handle of a spoon, of a hinged cover for said bowl, a slidable bar extending lengthwise said handle, means on the end of said bar for engaging the thumb, and a curved arm on the end of said handle adapted for a finger-rest.

3. As an article of manufacture, a spoon comprising a bowl and handle having its free end upturned, a cover for said bowl hinged at the junction of the bowl and handle, a sliding bar sliding in ways on said handle and pivotally connected with said cover, a bar and upwardly-curved arms on the end of said sliding bar adapted to engage the thumb and an upwardly-curved arm near the end of said handle providing a space between said arm and the upturned end of the handle to receive the forefinger.

Dated this 17th day of March, 1905.

HENRY D. WARD.

Witnesses:
    PENELOPE COMBERBACH,
    RUFUS B. FOWLER.